UNITED STATES PATENT OFFICE 2,383,281

PROCESS FOR PRODUCING MAGNESIUM CONTAINING BERYLLIUM

Charles B. Willmore, New Kensington, Pa., and Frank D. Chew, Detroit, Mich., assignors to Aluminum Company of America, Pittsburgh, Pa., a corporation of Pennsylvania No Drawing. Application January 8, 1944, Serial No. 517,604

4 Claims. (Cl. 75—168)

This invention relates to the production of magnesium and beryllium, and relates particularly to the production of magnesium containing beryllium.

Processes are well known for the production of magnesium from magnesium oxide by heating a mixture of the magnesium oxide with a material capable of reducing that compound, such as aluminum, at an elevated temperature to form magnesium, which volatilizes and is recovered by condensation of the magnesium vapor. Such processes are usually carried out by using materials containing magnesium oxide values, such as magnesite or dolomite, as a source of magnesium oxide, and in referring to magnesium oxide herein it is to be understood that such materials containing magnesium oxide are included.

It is frequently desirable to add beryllium to magnesium for a number of purposes, at least some of which are made known in the patent art and literature. It is an object of this invention to provide a method of producing magnesium mixed with beryllium, and it is a particular object of the invention to provide a procedure whereby the recovery of magnesium by reduction of magnesium oxide and volatilization of the resulting magnesium, and the recovery of beryllium from beryllium oxide or materials containing beryllium oxide, are carried out in such a manner as to produce magnesium containing beryllium.

In accordance with this invention, during the production of magnesium vapor by heating magnesium oxide and a reducing agent therefor, beryllium fluoride vapor is also produced and condensed along with the magnesium vapor formed. The sublimate containing magnesium and beryllium fluoride is then melted, and the beryllium fluoride is reduced to beryllium in that operation by a portion of the magnesium, thereby providing an alloy of magnesium and beryllium. Possibly some metallic beryllium is also present in the condensate before the condensate is melted, as a result of reduction of beryllium fluoride vapor by the magnesium, and such beryllium is, of course, also recovered in the magnesium in the melting of the sublimate.

We have found that beryllium fluoride vapor can be formed (in accordance with methods described in our copending applications Serial Nos. 484,476 and 484,477) during the reduction of the magnesium oxide, by heating along with the mixture of magnesium oxide and reducing agent a mixture of aluminum fluoride or magnesium fluoride, and beryllium oxide or material containing beryllium oxide values, such as the mineral beryl, which can be considered for practical purposes as being composed of the oxides of beryllium, aluminum, and silicon. Calcium fluoride can be used instead of aluminum fluoride or magnesium fluoride in the production of the beryllium fluoride, but in that case it is necessary that silica values be present along with the calcium fluoride and beryllium oxide in order for beryllium fluoride to be formed, whereas when aluminum fluoride or magnesium fluoride is used in producing the beryllium fluoride the presence of silica is objectionable, for at least part of the aluminum fluoride or magnesium fluoride reacts with the silica to form silicon fluoride, and as a result is not available for the formation of the desired beryllium fluoride. When siliceous material, such as beryl, is used as the source of beryllium oxide in the reaction, the ore itself contains the silica required when calcium fluoride is the fluoride utilized. If aluminum fluoride or magnesium fluoride is used instead of calcium fluoride, the silica can be eliminated from the ore by any of the several methods described for that purpose in our copending applications Serial Nos. 484,476 and 484,477. As in the patent applications mentioned, by the elimination of silica is meant either the physical removal of silica from the ore, or the conversion of it in situ, during or before the beryllium fluoride-producing operation, to a silicon compound which does not react readily with the fluoride present, or otherwise render the fluoride ineffective in the heating of the fluoride and beryllium-bearing material to produce beryllium fluoride.

For efficiency in producing the beryllium fluoride by the methods described above, it is desirable to provide at least the stoichiometric amount of aluminum fluoride, magnesium fluoride, or calcium fluoride for reaction with all of the beryllium oxide present, after allowing for such amounts of fluorine as may be lost to the beryllium fluoride-producing reaction by volatilization of the fluoride or by side reactions of the fluoride with other materials present under the particular conditions of operation. Two or more of the fluorides can be used together in producing the beryllium fluoride, if desired.

The beryllium fluoride vapor produced by reaction of the above mentioned fluorides with the beryllium oxide passes along with the magnesium vapor to a condensing zone or chamber of the apparatus, where both vapors condense. As is well known, beryllium fluoride can be reduced to beryllium by molten magnesium. Accordingly, when the mixture of condensed magnesium and beryllium fluoride is heated at a temperature sufficient for the magnesium to melt and reduce the beryllium fluoride—for example, about 700° C. or above—a melt containing magnesium having beryllium dissolved therein is obtained. The molten magnesium and beryllium may then be separated from the balance of the melt.

Magnesium is capable of retaining only a very small amount of beryllium in solution. However, it is possible to increase the amount of beryllium which can be held in solution by including in the magnesium another metal which magnesium dissolves readily and which is also capable of dissolving beryllium more readily than magnesium does. Aluminum is a metal which is suitable for that purpose. Consequently, when an amount of beryllium is to be formed in melting the condensate which exceeds the amount which the magnesium alone will dissolve, and it is desired to retain the excess in solution, the addition of aluminum to the condensate in an amount at least sufficient to increase to the desired extent the amount of beryllium which will remain in solution, is effective. The amount of aluminum (or other metal) which is necessary for the dissolving of the beryllium in this manner in any particular instance can be readily ascertained by reference to tables showing the solubility of beryllium in magnesium containing various amounts of aluminum, or by test. An excess of the additional metal beyond the amount required for dissolving the beryllium can, of course, be added, if desired, to produce a particular alloy of that metal and magnesium and beryllium. Thus, aluminum base alloys containing magnesium and beryllium can be produced by adding the desired proportion of aluminum to the condensate.

In carrying out the invention, the materials for producing beryllium fluoride may be mixed thoroughly with the reaction mixture for producing magnesium vapor, and the mass heated either loose or in the form of briquettes, or separate mixtures containing the magnesium-producing materials and those for producing beryllium fluoride may be heated together in the furnace. In either case, it is desirable that the various materials be in finely divided form to permit intimate mixing thereof.

As an example of the invention, a mixture containing in finely divided form 65 per cent of calcined magnesite, 28 per cent of aluminum, 1 per cent of beryl, 3 per cent of magnesium fluoride, and 3 per cent of calcium fluoride (the percentages being by weight), was briquetted and placed in one end of a horizontal retort having a vacuum pump connected to the opposite end. The mix was heated in the retort at a temperature of 1110° C. for 3 hours, a residual pressure of 0.15 mm. of mercury being maintained in the retort by the vacuum pump. After the retort was opened, aluminum was added to the condensate in sufficient amount to provide 1½ parts by weight of aluminum to 1 part by weight of magnesium present, and the mixture was melted at about 700° C. and then allowed to solidify. The resultant aluminum-magnesium alloy contained 0.02 per cent by weight of beryllium.

We claim:

1. A process for processing magnesium containing beryllium comprising producing magnesium vapor and beryllium fluoride vapor, condensing said vapors together, and melting the resulting condensate at a temperature at which beryllium fluoride reacts with magnesium to produce beryllium.

2. A process for producing magnesium-beryllium alloys comprising reducing magnesium oxide and volatilizing and condensing the resultant magnesium, condensing beryllium fluoride vapor along with the magnesium vapor produced, and melting the resultant condensate at a temperature sufficient for magnesium to react with beryllium fluoride and produce beryllium.

3. A process for producing magnesium-beryllium alloys comprising reducing magnesium oxide and volatilizing the resultant magnesium, producing and volatilizing beryllium fluoride during the reducing and volatilizing of the magnesium oxide, condensing together the magnesium and beryllium fluoride vapors thus produced, and melting the resultant condensate at a temperature sufficient for magnesium to react with beryllium fluoride and produce beryllium.

4. A process for producing magnesium-beryllium alloys comprising heating a mixture of magnesium oxide, a material capable of reducing magnesium oxide to magnesium, and substances capable of producing beryllium fluoride by reaction under the conditions of operation, said heating being at a temperature sufficient for at least part of the magnesium oxide to be reduced and for the resultant magnesium to be volatilized, and for the resultant beryllium fluoride to be volatilized, condensing the resultant magnesium and baryllium fluoride vapors together, and melting the condensate at a temperature sufficient for magnesium to react with beryllium fluoride and produce beryllium.

CHARLES B. WILLMORE.
FRANK D. CHEW.